United States Patent [19]
Merkenich et al.

[11] Patent Number: 5,211,978
[45] Date of Patent: May 18, 1993

[54] COMPOSITION AND METHOD OF MAKING PROCESSED CHEESE

[75] Inventors: Karl Merkenich, Fuerth/Fahrenbach; Andrea Maurer-Rothmann, Weinheim; Edgar Walter, Mannheim; Guenter Scheurer, Hasloch; Henning Klostermeyer, Freising, all of Fed. Rep. of Germany

[73] Assignee: BK Ladenburg GmBH, Ladenburg, Fed. Rep. of Germany

[21] Appl. No.: 802,635

[22] Filed: Dec. 9, 1991

[30] Foreign Application Priority Data

Dec. 19, 1990 [DE] Fed. Rep. of Germany ....... 4040622

[51] Int. Cl.⁵ ............................................. A23C 19/082
[52] U.S. Cl. .................................. 426/582; 426/604; 426/654
[58] Field of Search ............... 426/582, 583, 654, 601, 426/604

[56] References Cited

U.S. PATENT DOCUMENTS

| | | | |
|---|---|---|---|
| 4,303,691 | 12/1981 | Sand et al. | 426/582 |
| 4,424,237 | 1/1984 | Wittman, III | 426/654 |
| 4,853,243 | 8/1989 | Kahn et al. | 426/654 |

*Primary Examiner*—Jeanette Hunter
*Assistant Examiner*—Helen Pratt
*Attorney, Agent, or Firm*—Foley & Lardner

[57] ABSTRACT

Composition and method of making a processed cheese preparation containing cheese, fat, processing salts, water and conventional additives, such as emulsifiers, binding agents, thickeners, curds, milk protein and aroma materials in the usual amounts, wherein trisodium citrate and/or sodium phosphate are used as processing salts in an amount of from 1.5 to 3% by weight and the mixture contains a glycerol or saccharose ester with one citric acid residue and one edible fatty acid residue or with two edible fatty acid residues in an amount of from 0.5 to 2% by weight.

6 Claims, No Drawings

COMPOSITION AND METHOD OF MAKING PROCESSED CHEESE

BACKGROUND OF THE INVENTION

The present invention relates to a novel processed cheese preparation, as well as to the use of special additives in the production of processed cheese.

Processed cheese preparations were first produced as long ago as 1911 and subsequently have been continuously improved in taste, appearance and texture by change of the composition of the starting materials. Depending upon the composition, spreadable or sliceable products can thereby be obtained. The starting material is a sliceable cheese, such as Gouda, Emmentaler or the like, which is comminuted and mixed together with fat, especially butter, and processing salts, as well as possibly with some water, at a temperature of from 80° to 95° C. and melted, whereafter the mass is shaped, cooled and packaged.

The addition of processing salts with their calcium-complexing and buffering action, in an amount of about 2.5 to 4% of the total weight, proves to be absolutely necessary in order to prevent a demixing of casein, fat and water. On the other hand, it has been shown that the processing salts lead to a deposition of crystals on the surface of the processed cheese in the event of comparatively long storage, especially in the event of varying temperature. The materials separated out in very fine crystals are thought by the user to be either mold or the cheeses are also regarded as being no longer edible because of the "sandy" surface. Naturally, crystallizing out takes place more quickly and extensively when the concentration of the processing salts is higher, so that, especially in the case of a processing salt content of 3 to 4% by weight, crystal formation is observed within the course of a few weeks. But, even in the case of a processing salt concentration of 1.5 to 2% by weight, which is not fully sufficient, crystallizing out cannot be prevented when trisodium citrate is used as a processing salt.

Therefore, there is a need to produce processed cheese preparations which, on the one hand, have a melting behavior which is sufficient for problem-free production and, on the other hand, does not lead to crystallizing out of the processing salts. Furthermore, the additives must not have a negative influence on the taste and sensory properties of the finished processed cheese.

SUMMARY OF THE INVENTION

It is therefore an object of the present invention to provide a processed cheese preparation which has a melting behavior which is sufficient for problem-free production and does not lead to crystallizing out of the processing salts.

In accomplishing these and other objects, there has been provided, according to the present invention, a processed cheese preparation containing cheese, fat, processing salts, water and conventional additives, such as emulsifiers, binding agents, thickeners, curds, milk protein and aroma materials in usual amounts, wherein trisodium citrate and/or sodium phosphate are used as processing salts, in an amount of from 1.5 to 3% by weight, and the mixture contains a glycerol or saccharose ester with one citric acid residue and one edible fatty acid residue or with two edible fatty acid residues in an amount of from 0.5 to 2% by weight.

Glycerol and saccharose esters with citric acid and/or fatty acids are already known as emulsifiers and additives for milk and cream desserts and ice creams in amounts of up to 0.5% by weight. These materials thereby have the function of preventing the demixing of the water/oil phases.

Surprisingly, in the processed cheese preparations of the present invention, these materials not only as emulsifiers, but also permit the added amount of the processing salts, especially of trisodium citrate, to be approximately halved in comparison with known recipes. Therefore, crystal formation no longer occurs and efflorescence on the cheese surface does not take place.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

Especially preferred esters according to the present invention include saccharose mono- and diesters with edible fatty acids containing 8 to 20, and preferably 12 to 18 carbon atoms, which acids can be saturated or unsaturated. Besides 1 or 2 of these particular edible fatty acid residues, the glycerol esters also contain a citric acid residue.

For sufficient action of the ester additives, it is necessary to add them at about 0.5 to 2.5% by weight of the total amount. An excess naturally does not prevent the desired effect but is not advisable reasons of economy and taste. The processed cheese mixture according to the present invention can, without problems, contain up to 3% by weight of processing salt without crystallizing out taking place.

As processing salts, trisodium citrate or sodium phosphate or mixtures thereof can be used, usually in the form of commercially available hydrates.

As binding agents and thickeners, one can use the usual amounts, i.e., 0 to 3% by weight and preferably 0.5 to 1% by weight of the total mass, of starch, modified starch, or especially starch rendered soluble by partial decomposition and/or derivatisation, such as starches from guar flour, carob bean flour, carragheen, methyl- and carboxymethylcellulose, agar-agar, alginates and similar products.

Butter is preferred as the source of fat. However, it is also possible to use other animal or vegetable fats and oils, such as are employed in the margarine industry, or also cream.

As cheese replacement materials, one can also use casein, whey powder, curds, yoghurt, milk protein and, to a certain extent, also vegetable proteins and especially soya proteins.

In order to change the flavor, one can also add flavoring salts and herbs, and optionally particulate products, for example meat products, fruits, nuts, fungi and the like.

According to present practice, in some cases the processed cheese mass is brought into a foamed and creamy state by passing gases, especially nitrogen, through the mixture. Such embodiments are also possible with preparations according to the present invention.

The present invention is further described below with regard to the following illustrative examples.

EXAMPLE 1

Spreadable processed cheese

Ingredients:
71.7 kg Gouda (45% fat in the dry weight)
1.8 kg trisodium citrate
1.4 kg distearoyl citric acid glyceride (Lamegin 7E609)
5.2 kg butter
19.9 kg water The above products are mixed together in a stirrer vessel and heated, while slowly stirring, to the melting temperature of about 90°–92° C., in about to 20 minutes by passing steam through. Thereafter, the mixture is homogenized with vigorous stirring, the mass is poured into molds, cooled to ambient temperature, and temporarily stored for 12 hours. Final storage until use takes place at 6° C.

A spreadable processed cheese is obtained which contains 46% of fat in the dry weight, in the case of a total dry weight of 46%. Even after storage for 4 to 6 months, the appearance and consistency do not change and, in particular, no efflorescence of the processing salts is observed.

EXAMPLE 2

Sliceable processed cheese

Ingredients:
74.9 kg Gouda (45% fat in the dry weight)
1.5 kg trisodium citrate
0.4 kg modified starch (waxy maize starch, purity W)
1.0 kg saccharose monostearoyl monocitric acid ester
4.2 kg butter
18.0 kg water The mixture is worked up as in Example 1, except that it is heated to 95° C.

A sliceable cheese is obtained with a fat content of 47% in the dry weight and with a dry weight of about 50%. In this preparation, also, no efflorescence of processing salts is observed after storage for 6 months.

EXAMPLE 3

Sliceable processed cheese

Ingredients:
73.2 kg Edam (46% in the dry weight)
2.5 kg trisodium citrate
2.0 kg glycerol 1-citric acid 3-stearic acid ester (Acidan BC)
4.8 kg butter
17.5 kg water The mixture is worked up as described in Example A sliceable processed cheese is obtained, with a fat content of 46% fat in the dry weight, which can be stored without change for 6 months.

What is claimed is:

1. A processed cheese preparation comprising cheese, fat, water, and a processing salt component comprised of at least one of trisodium citrate or sodium phosphate, wherein said processing salt component is present at a concentration of from about 1.5 to about 3% by weight, and wherein said preparation further comprises an ester of glycerol or of saccharose having one citric acid residue and further having either one or two of an edible fatty acid residue, wherein said ester is present at a concentration of from about 0.5 to about 2% by weight.

2. A processed cheese preparation according to claim said cheese preparation further comprising any of the following additives: an emulsifier, a binding agent, a thickener, curds, a milk protein or an aroma providing material.

3. A processed cheese preparation according to claim 1, wherein said ester is present at a concentration of from about 1% to about 2% by weight.

4. A processed cheese preparation according to claim 1, wherein said ester comprises an ester selected from the group consisting of (i) a saccharose mono- or diester with edible fatty acids containing 8 to 20 carbon atoms, which can be saturated or unsaturated and (ii) a glycerol ester with one or two of said edible fatty acid residues and one citric acid residue.

5. A processed cheese preparation according to claim 4, wherein said edible fatty acid in said ester contains 12 to 18 carbon atoms.

6. A method of producing a processed cheese comprising the steps of mixing and heating to the melting temperature a mixture comprising cheese, fat, water and a processing salt component comprised of at least one of trisodium citrate or sodium phosphate, homogenizing the resulting melted mixture with vigorous stirring, and cooling the resulting homogenized mixture to ambient temperature, wherein said processing salt component is present at a concentration of from about 1.5 to about 3% by weight, and wherein said preparation further comprises an ester of glycerol or of saccharose having one citric acid residue and further having either one or two of an edible fatty acid residue, wherein said ester is present at a concentration of from about 0.5 to about 2% by weight.

* * * * *